US012479447B1

(12) United States Patent
Callis et al.

(10) Patent No.: US 12,479,447 B1
(45) Date of Patent: Nov. 25, 2025

(54) SAFETY DRIVER ASSESSMENT AND DYNAMIC AUTONOMOUS DRIVING

(71) Applicant: United Servies Automobile Association (USAA), San Antonio, TX (US)

(72) Inventors: Shayla Leigh Callis, Simi Valley, CA (US); Madhusudhana Rao Abburi, San Antonio, TX (US); Breanna Nicole Allerkamp, Boerne, TX (US); Surender Kumar, Palatine, IL (US); William Daniel Farmer, Carrollton, TX (US); Stacy Callaway Huggar, San Antonio, TX (US); Zachery C. Lake, Fort Wayne, IN (US); Neetu Jain, Coppell, TX (US); Jose L Romero, San Antonio, TX (US); Andre Rene Buentello, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 62 days.

(21) Appl. No.: 18/113,460

(22) Filed: Feb. 23, 2023

Related U.S. Application Data

(60) Provisional application No. 63/314,058, filed on Feb. 25, 2022.

(51) Int. Cl.
*B60W 40/09* (2012.01)
*B60W 40/02* (2006.01)
*B60W 60/00* (2020.01)
*G06F 16/2457* (2019.01)
*G06N 20/00* (2019.01)

(52) U.S. Cl.
CPC ............ *B60W 40/09* (2013.01); *B60W 40/02* (2013.01); *B60W 60/0015* (2020.02); *B60W 60/0053* (2020.02); *G06F 16/24578* (2019.01); *G06N 20/00* (2019.01); *B60W 2420/403* (2013.01); *B60W 2420/408* (2024.01);
(Continued)

(58) Field of Classification Search
CPC .. B60W 40/09; B60W 40/02; B60W 60/0015; B60W 60/0053; B60W 2420/403; B60W 2420/408; B60W 2540/043; B60W 2540/30; B60W 2556/10; B60W 2556/65; G06F 16/24578; G06N 20/00
See application file for complete search history.

(56) References Cited

U.S. PATENT DOCUMENTS 10,402,771 B1 * 9/2019 De .......................... G08G 1/20
10,697,784 B1 * 6/2020 Li .......................... G08G 1/202
(Continued)

*Primary Examiner* — Brian Wilson
(74) *Attorney, Agent, or Firm* — Fletcher Yoder, P.C.

(57) ABSTRACT

A computing system is configured to trigger a safety driver assessment and obtain driving conditions for a route using a variety of sensors and databases. The computing system is also configured to receive driver information and determine a safety driving test based on the driver information and driving conditions. During the safety driving test, the computing system is configured to measure, via the variety of sensors of an autonomous vehicle, driving responses of a driver operating the autonomous vehicle. Based on measured driving responses, the computing system is configured to determine a safety driving score and save the safety driving score in a safety test record.

20 Claims, 4 Drawing Sheets

(52) U.S. Cl.
 CPC ... *B60W 2540/043* (2020.02); *B60W 2540/30* (2013.01); *B60W 2556/10* (2020.02); *B60W 2556/65* (2020.02)

(56) References Cited

U.S. PATENT DOCUMENTS

| | | | | |
|---|---|---|---|---|
| 10,783,587 | B1* | 9/2020 | Augustine | G06Q 40/08 |
| 2006/0241974 | A1* | 10/2006 | Chao | G06Q 10/06398 |
| | | | | 705/2 |
| 2019/0031201 | A1* | 1/2019 | Lundsgaard | B60W 30/16 |
| 2019/0049954 | A1* | 2/2019 | Mitchell | H04L 63/1425 |
| 2021/0109528 | A1* | 4/2021 | Heyl | B60W 60/0018 |
| 2021/0362728 | A1* | 11/2021 | Sato | G07C 5/04 |

* cited by examiner

SAFETY DRIVER ASSESSMENT AND DYNAMIC AUTONOMOUS DRIVING

CROSS-REFERENCE TO RELATED APPLICATION

The present application claims the benefit of and priority to U.S. Provisional Patent Application Ser. No. 63/314,058, titled "SAFETY DRIVER ASSESSMENT AND DYNAMIC AUTONOMOUS DRIVING," which was filed on Feb. 25, 2022, and which is herein incorporated by reference in its entirety for all purposes.

BACKGROUND

The present disclosure relates generally to systems and methods related to safety driver assessment in an autonomous driving environment. More specifically, the techniques discussed herein relate to assessing potential safety drivers in autonomous vehicles and identifying safety drivers based on assessments This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As autonomous driving systems become more prevalent, assessments related to autonomous driving become more important for improving various aspects of autonomous driving, such as safety, performance, flexibility, and adaptability. For example, to assess driving performance of drivers operating autonomous vehicles, driving tests may be implemented to identify safety drivers who may take over the autonomous vehicles in certain situations that autonomous driving modes may not work. Based on driving performance assessments, types or experience levels of drivers may be determined and certain recommendations (e.g., different levels of autonomy for different drivers) may be provided for upcoming driving events (e.g., upcoming driving routes).

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a processor coupled to a communication component. The processor may receive a list of services and driving behavior data associated with each of a group of users. Each list of services may include one or more services that a respective user of the group of users is willing to provide. The processor may then build a model representative of an expected location of each of the group of users based on the driving behavior data. In response to receiving a request for roadside assistance from a first computing device associated with a first user, the processor may identify a portion of the group of users to perform the roadside assistance based on the model and send a request to perform the roadside assistance to one or more computing devices associated with the portion of the group of users. The processor may receive an acceptance to the request from a second computing device associated with a second user of the portion of the group of users. Furthermore, the processor may send a location of the first computing device to the second computing device and send information associated with the second user to the first computing device.

In another embodiments, a method may include receiving, via at least one processor, a list of services associated with each of a group of users. Each list of services may include one or more services that a respective user of the group of users is willing to provide. The method may also include receiving, via the at least one processor, driving behavior data of each of the group of users, and building a model representative of an expected location of each of the group of users based on the driving behavior data of each of the group of users. The method may further include receiving a request for roadside assistance from a first computing device associated with a first user, identifying a portion of the group of users to perform the roadside assistance based on the model, sending a request to perform the roadside assistance to one or more computing devices associated with the portion of the group of users, receiving an acceptance to the request from a second computing device associated with a second user of the portion of the group of users, sending a first location of the first computing device to the second computing device after receiving the acceptance, and sending information associated with the second user to the first computing device.

In yet another embodiment, a non-transitory computer-readable medium including computer-executable instructions that, when executed, are configured to cause one or more processors to perform operations. The operations may include receiving, via the one or more processors, a list of services associated with each of a group of users and each list of services may include one or more services that a respective user of the group of users is willing to provide, receiving, via the one or more processors, driving behavior data of each of the group of users, building a model representative of an expected location of each of the group of users based on the driving behavior data of each of the group of users, receiving a request for roadside assistance from a first computing device associated with a first user, identifying a portion of the group of users to perform the roadside assistance based on the model, sending a request to perform the roadside assistance to one or more computing devices associated with the portion of the group of users, receiving an acceptance to the request from a second computing device of the one or more computing devices, wherein the first second device is associated with a second user of the portion of the group of users, sending a first location of the first computing device to the second computing device after receiving the acceptance, and sending information associated with the second user to the first computing device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
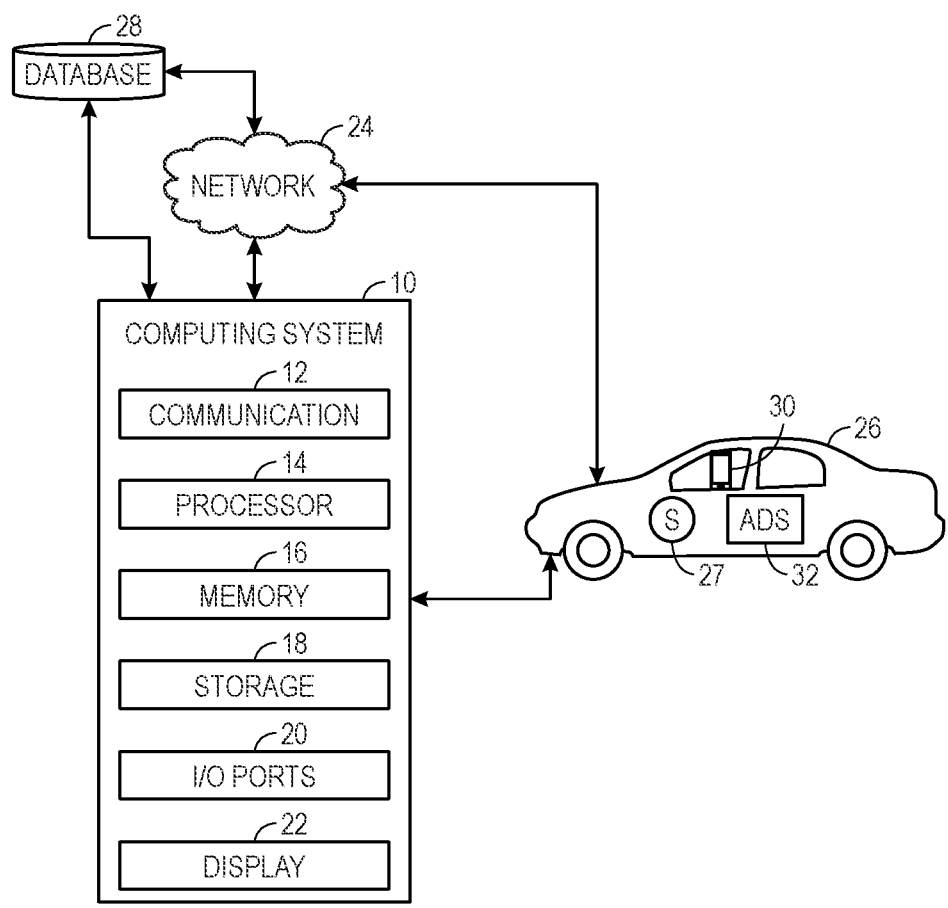
FIG. 1 illustrates a block diagram of a system communicatively coupled to a number of data sources, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Autonomous vehicles may be referred to as vehicles incorporating vehicular automation technologies (e.g., mechatronics, artificial intelligence, multi-agent systems) to assist users of the vehicles. Autonomous vehicles may sense surrounding environments and operate safely with limited human input. For example, the autonomous vehicles may use a variety of sensors (e.g., camera, radar, light detection and ranging (LIDAR), sonar, global positioning system (GPS), and inertial sensors) to perceive approaching vehicles, pedestrians, road condition, weather, traffic signs and signals, obstacles, and the like. The autonomous vehicles may use artificial intelligence to analyze data acquired from the variety of sensors to identify potentially interfering vehicles or pedestrians, determine automation levels (e.g., driver hands on, hands off, eyes off, and mind off), and identify appropriate navigation routes.

With increasing use of the autonomous vehicles, autonomous driving is changing current transportation system, ways to travel, and industries related to transportation and travel, such as automobile manufacturing, insurance, and rental. Such changes create new challenges in various aspects of the autonomous driving, such as safety, performance, flexibility, and adaptability. For instance, safety drivers may remain important for many years before a transition to a fully autonomous driving environment completes. During the transition time, assessments of driving behavior (e.g., safety driver assessments) with improved accuracies may impact the safety of the autonomous driving.

In some embodiments, a computing system may trigger a safety driver assessment. The computing system may also obtain driving conditions (road condition, weather information, traffic, crowdedness, road curvature, terrain, traffic regulation, and signage) for the route using a variety of sensors (e.g., camera, radar, light detection and ranging (LIDAR), sonar, global positioning system (GPS), and inertial sensors) and databases. The computing system may receive driver information and determine a safety driving test based on the driver information and driving conditions. In some embodiments, before initiating the safety driving test, the computing system may optionally notify nearby vehicles of the upcoming safety driving test. To test alertness of the safety driver, the safety driver may not be informed prior to initiation of the test. During the safety driving test, the computing system may measure, via various sensors of an autonomous vehicle, driving responses of a driver operating the autonomous vehicle. Based on measured driving responses, the computing system may determine a safety driving score and save the safety driving score in a safety test record. The safety test record may include the safety driving score, driving condition, driving time, and other information associated with the safety driving test.

In some embodiments, the safety driving test may include periodic tests implemented at a predetermined time interval and/or at random time intervals. For each test of the periodic tests, the computing system may generate a corresponding safety test record. The computing system may collect safety test records associated with the driver to create a safety driver record. A database may store safety driver records from different drivers. The computing system may utilize the stored safety driver records to determine a preferred safety driver. For example, the computing system may identify occupants of an autonomous vehicle for an upcoming route. Based on identifications of the occupants, the computing system may receive safety driver records of the occupants. The computing system may also identify driving conditions (e.g., weather, crowdedness, road curvature, terrain, traffic regulation, and signage) of the upcoming route. Based on the safety driver records of the occupants and identified driving conditions, the computing system may provide a recommendation for a safety driver for the upcoming route.

In certain embodiments, a variety of driving-related records may be utilized to enable a dynamic autonomous driving for a driver. For example, the computing system may receive a safety driver record, a driving history, and other records for alternative driving (e.g., go-karting, cycling) associated with the driver. Based on received driving-related records, the computing system may determine a level of autonomous driving (e.g., semi-automation or full automation) for the driver. Based on the determined level of autonomous driving, the computing system may enable (e.g., via an autonomous driving system) a corresponding level of manual driving in an autonomous vehicle operated by the driver. As driving experience of the driver increases, different levels of autonomous driving may be determined, resulting in different levels of manual driving being enabled or unlocked.

By way of introduction, FIG. 1 is a block diagram of a system communicatively coupled to a number of data sources. The system may include a computing system 10 communicatively coupled to a variety of data sources that may assist the computing system 10 in performing a safety driver assessment for a driver (e.g., an autonomous vehicle driver). Data from the variety of data sources may include driver data (e.g., age, driving experience, location, physical conditions), driving history data (e.g., driving habits, frequent driving routes, incident reports), driving behavior data (e.g., driving responses measured during a safety driving test), safety driver data (e.g., historical safety driving test result), traffic data, road condition data, weather data, reference data (e.g., average driving responses of drivers at different levels of autonomous driving), and the like.

The computing system 10 may include various types of components that may assist the computing system 10 in performing various types of computer tasks and operations. For example, the computing system 10 may include a communication component 12, a processor 14, a memory 16, a storage 18, input/output (I/O) ports 20, a display 22, and the like.

The communication component 12 may be a wireless or wired communication component that may facilitate communication between the computing system 10 and various other computing systems and devices via a network, the Internet, or the like. For example, the communication component 12 may allow the computing system 10 to obtain data from the variety of data sources, such as databases (e.g., driver information database, driving history database, safety driver database, road condition database, weather information database), user devices (e.g., smart phones, desktop computers, laptops, tablets), vehicle systems (e.g., autonomous driving systems), and the like. The communication component 12 may receive and send notifications to the user devices and the vehicle systems. The communication component 12 may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The processor 14 may process instructions for execution within the computing system 10. The processor 14 may include single-threaded processor(s), multi-threaded processor(s), or both. The processor 14 may process instructions stored in the memory 16. The processor 14 may also include hardware-based processor(s) each including one or more cores. The processor 14 may include general purpose processor(s), special purpose processor(s), or both. For example, the special purpose processor(s) may include artificial intelligence processor(s) designed on the basis of machine learning and artificial neural network. The artificial intelligence processor(s) may read human behavior (e.g., driving behavior) and perform computations based on the human behavior. The processor 14 may be communicatively coupled to other internal components (such as the communication component 12, the storage 18, the I/O ports 20, and the display 22).

The memory 16 and the storage 18 may be any suitable articles of manufacture that can serve as media to store processor-executable code, data, or the like. These articles of manufacture may represent computer-readable media (e.g., any suitable form of memory or storage) that may store the processor-executable code used by the processor 14 to perform the presently disclosed techniques. As used herein, applications may include any suitable computer software or program that may be installed onto the computing system 10 and executed by the processor 14. The memory 16 and the storage 18 may represent non-transitory computer-readable media (e.g., any suitable form of memory or storage) that may store the processor-executable code used by the processor 14 to perform various techniques described herein. It should be noted that non-transitory merely indicates that the media is tangible and not a signal.

The I/O ports 20 may be interfaces that may couple to other peripheral components such as input devices (e.g., keyboard, mouse), sensors, input/output (I/O) modules, and the like. The display 22 may operate as a human machine interface (HMI) to depict visualizations associated with software or executable code being processed by the processor 14. In one embodiment, the display 22 may be a touch display capable of receiving inputs from an operator of the computing system 10. The display 22 may be any suitable type of display, such as a liquid crystal display (LCD), plasma display, or an organic light emitting diode (OLED) display, for example. Additionally, in one embodiment, the display 22 may be provided in conjunction with a touch-sensitive mechanism (e.g., a touch screen) that may function as part of a control interface for the computing system 10.

It should be noted that the components described above with regard to the computing system 10 are examples and the computing system 10 may include additional or fewer components relative to the illustrated embodiment.

In certain embodiments, the computing system 10 may be communicatively coupled to a network 24, which may include collections of computing systems, the Internet, an Intranet system, or the like. The network 24 may facilitate communication between the computing system 10 and various other data sources. For instance, the network 24 may be communicatively coupled to an autonomous driving system 32 on an autonomous vehicle 26. In some embodiments, the network 24 may also be communicatively coupled to one or more databases 28, which may store data regarding driver information, driving history, safety driver records, road condition, weather information, and other information that may be relevant for performing safety driver assessments, safety driver recommendation, and dynamic autonomous driving.

Referring back to the autonomous driving system 32, in some embodiments, the autonomous driving system 32 may monitor operations of the autonomous vehicle 26. For instance, the autonomous driving system 32 may monitor the locations of the autonomous vehicle 26, frequency of use of the autonomous vehicle 26, times at which the autonomous vehicle 26 is in use, mileage driven by the autonomous vehicle 26, frequent routes of the autonomous vehicle 26, autonomous driving modes in which the autonomous vehicle 26 is in use, and the like. The autonomous driving system 32 may be communicatively coupled to various sensors 27 or devices within the autonomous vehicle 26 to acquire vehicle operation data of the autonomous vehicle 26. By way of example, the autonomous driving system 32 may be communicatively coupled to a GPS, an odometer, a dash camera and/or other onboard cameras, radar sensor(s), LIDAR sensor(s), sonar sensor(s), inertial sensor(s), and other suitable sensors or devices that may provide information regarding the operations of the autonomous driving system 32.

In certain embodiments, the autonomous driving system 32 may cause the various sensors 27 or devices to measure driving response data of a driver operating the autonomous vehicle 26. For example, during a safety driving test, the autonomous driving system 32 may cause suitable sensors or devices (e.g., onboard cameras) to measure various driving responses of the driver, such as focusing on the road (e.g., frequencies of checking side and rear mirrors (e.g., observed by sensors checking eye movement), awareness of approaching vehicles, bikers, pedestrians, animals, obstacles, or signages), response time and action when the autonomous driving system 32 changes driving mode (e.g., from one autonomous driving mode to one manual driving mode), response time and action when the autonomous driving system 32 issues an alert or a warning (e.g., alerting a sharp curve ahead), and the like. The autonomous driving system 32 may also cause suitable sensors or devices (e.g., LIDAR sensors, inertial sensors) to measure additional data related to the driving response measurements, such as speeds, distances or directions of approaching vehicles, distances from nearby bikers, pedestrians, or obstacles, speed and/or acceleration of the autonomous vehicle 26 when the driver responds to a sharp turn alert, and so on.

Additionally, in some embodiments, the autonomous driving system 32 may be communicatively coupled to other computing devices such as mobile devices 30 (e.g., mobile phones, tablets, laptop computers, smart watches, and the like) to receive/send information from/to one or more occupants of the autonomous vehicle 26. For example, the autonomous driving system 32 may receive requests for scheduling safety driving tests from the occupants via the mobile devices 30, monitor the usage of mobile devices 30 during operations of the autonomous vehicle 26, or send a recommendation for a safety driver to the occupants via the mobile devices 30.

The autonomous driving system 32 may include artificial intelligence processing units (e.g., artificial intelligence processors or circuits, memory storing code for analysis, modeling, or prediction based on artificial intelligence) designed for processing autonomous driving related data (e.g., the vehicle operation data, the driver response data) and making corresponding operations (e.g., maintaining current autonomous driving mode or changing to a different mode) based on processing output. The autonomous driving system 32 may also include a variety of autonomous driving algorithms designed for different driving conditions (e.g., weather, crowdedness, road curvature, terrain, traffic regulation, and signage), different levels of safety driving experience, safety driving tests for different driving conditions or a combination thereof.

The computing system 10 may use the communication component 12 to receive data collected by the autonomous driving system 32, such as the vehicle operation data, the driving response data, the additional data related to the driving response measurements, information received from the occupants, and monitored usage of mobile devices during operations of the autonomous vehicle 26. The computing system 10 may further process the received data (e.g., using artificial intelligence) and output processed data (e.g., a safety driving score, settings of a dynamic autonomous driving). The computing system 10 may also use the communication component 12 to transmit the data collected by the autonomous driving system 32 or the processed data to the one or more databases 28 for storage. The stored data may be retrieved by the computing system 10 to provide autonomous driving related services, such as a safety driver recommendation for occupants of an autonomous vehicle for an upcoming route or an enablement of a dynamic autonomous driving. The computing system 10 may use the communication component 12 to transmit data associated with the autonomous driving related services to the mobile devices 30 or the autonomous driving system 32.

Although the autonomous driving system 32 and the one or more databases 28 are described as being communicatively coupled to the computing system 10 via the network 24, it should be noted that, in other embodiments, the autonomous driving system 32 and the one or more databases 28 may be communicatively coupled directly to the computing system 10.

Figure 2:
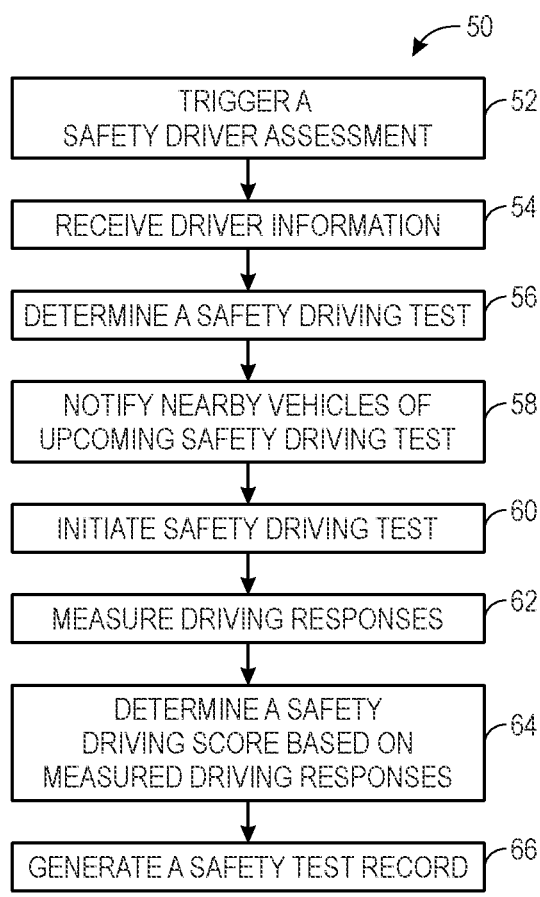
FIG. 2 illustrates a flow chart of an example method for generating safety test records using the system of FIG. 1, in accordance with embodiments described herein.

With the foregoing in mind, FIG. 2 illustrates a flow chart of an example method 50 for generating safety test records using the system described above. The computing system 10 may perform operations described below via the processor 14 based on processor-executable code stored in the memory 16 and the storage 18. The processor 14 may execute the processor-executable code to perform a safety driver assessment. Based on driving responses measured during a safety driving test, the processor 14 may determine a safety driving score and generate a safety test record including the safety driving score and other data associated with the safety driving test (e.g., driving condition, driving time).

Referring now to FIG. 2, at block 52, the computing system 10 may trigger a safety driver assessment. For example, the computing system 10 may receive a request for assessing an autonomous vehicle driver from a user (e.g., a driver) and/or from another electronic system and trigger the safety driver assessment in response to receiving the request. The driver and/or other electronic system may use various user devices (e.g., smart phones, tablets, laptops, desktop computers) to create the request. In some embodiments, the driver may use an application (e.g., safety driver assessment app or website) operating on the user devices to create the request. In some embodiments the request may be explicitly requested by the user and in other embodiments the request may be implemented by the application without an explicit request from the user. In some embodiments, the driver may use voice commands on a smart device (e.g., smart speaker) to create the request. The request may include driver input, such as desired time or time range and location information regarding an autonomous vehicle driver assessment.

After triggering the safety driver assessment, at block 54, the computing system 10 may receive driver information. The driver information may include identification (e.g., name, age, address, driver license number, social security number, photo), driving experience, physical condition (e.g., nearsightedness, disability), driving history (e.g., driving habits, frequent driving routes, incident reports), driving behavior (e.g., measured driving responses), safety driver record (e.g., historical safety driver assessment result), and the like. The computing system 10 may receive the driver information (e.g., identification, physical condition) from the driver via the user devices. Additionally or alternatively, the computing system 10 may receive the driver information (e.g., driving history, driving behavior, safety driver record) by querying the one or more databases 28 using the identification. In some cases, the computing system 10 may receive the driver information (e.g., driving habits) by searching the network 24 using the identification.

At block 56, the computing system 10 may determine a safety driving test based on the analysis of a variety of factors including but not limited to driver information, driving conditions, and other relevant data. The computing system 10 may use artificial intelligence processor(s) to analyze received data, such as the input presented in the request for assessing the autonomous vehicle driver, the driver information, and other relevant data (e.g., road condition, weather, reference data). The computing system 10 may use various techniques to perform the data analysis, such as data mining, filtering, similarity analysis, modeling, prediction, and the like. Such techniques may be based on artificial intelligence and machine learning. Based on the data analysis, the computing system 10 may determine a set of criteria (e.g., time, location, driving condition) regarding the safety driving test. The set of criteria may be determined to ensure a safety driving of the driver during the safety driving test.

In some embodiments, the computing system 10 may desire to test a driver's effectiveness under typical driving scenarios of the driver. This may help test attentiveness in typical driving scenarios. The computing system 10 may compare the driver input with received driver information to identify typical driving situations of a user, which may indicate that a test should be performed. The computing system 10 may then determine certain criteria (e.g., date, location) regarding the safety driving test based on identified similarities. For example, the driver input may indicate that the driver, John Smith, typically drives in an urban environment with uncrowded traffic and good visibility. In addition, the driver input may also indicate that John Smith has a vacation habit of mountain driving. The computing system 10 may analyze driving history of John. Through driving history analysis, the computing system 10 may identify frequent driving routes and corresponding times indicating that John frequently drives on urban roads at times when the traffic is not heavy (e.g., avoiding commute times). The computing system 10 may also identify driving habits indicating that John drives on mountain roads every year during vacation times. Based on identified similarities between John's input and received driver information, such as urban driving with uncrowded traffic and vacation habit of mountain driving, the computing system 10 may determine that the safety driving test includes at least one test to be conducted on an uncrowded urban road with acceptable visibility and at least one test to be conducted on an uncrowded mountain road with acceptable visibility.

In some embodiments, the computing system 10 may desire to test unfamiliar driving scenarios to identify a driver's effectiveness in such scenarios. The computing system 10 may compare the driver input with received driver information to identify mismatches. For example, the driver input may indicate that another driver, Robert Johnson, typically drives in an urban environment with crowded traffic. However, through driving history analysis, the computing system 10 may identify incident reports indicating that Robert had multiple incidents occurred on urban roads when the traffic was heavy, and visibility was good. In addition, the computing system 10 may identify photos or videos posted on social media indicating that Robert often takes photos or videos while driving on crowded urban roads. Based on identified mismatches between Robert's input and received driver information, such as driver's capability of safely driving on crowded urban roads, the computing system 10 may determine that the safety driving test should start with uncrowded urban roads despite the driver's typical driving scenario (e.g., as the typical driving scenario may be a safety concern and/or may not be the desired test).

The computing system 10 may analyze other relevant data to determine the safety driving test. For example, the computing system 10 may query a road condition database to identify road work that may occur on a route to be used in the safety driving test at a projected test time, query a weather information database to identify undesired weather condition (e.g., storm) that may occur on the route at the projected test time, or query a safety driver record database to analyze historical safety driver assessment results, and the like. Based on analyzing the other relevant data, the computing system may determine new criteria of the safety driver test, or update determined criteria. For example, the computing system 10 may change a projected route having road work in at the projected test time, change the projected test time to avoid a potential storm, or add a new test route different from previous test routes identified in the safety driver record.

The safety driving test may include periodic tests. The computing system 10 may determine a time interval at which the periodic tests may be implemented. The time interval may be 30 minutes, 3 days, 1 week, 3 months, or the like. Through the periodic tests, the computing system 10 may track changes (e.g., performance of autonomous driving in various driving conditions) over the time. In some embodiments, the test may include an autonomous driving mode (e.g., full automation) randomly shutting off and/or entering a hybrid shut off mode where the autonomous driving mode releases control to a driver but can resume control in the event of a detected safety issue (e.g., a predicted collision). The tests may be performed at certain intervals (e.g., 3, 5, or 10 minute). In some embodiments, the autonomous driving mode may be shut off based on surrounding conditions (e.g., real-time traffic, weather) and driver status (e.g., driving focus). For example, during the safety driving test, the computing system 10 may cause the autonomous driving system 32 to shut off a full automation mode and enable a semi-automation mode when detecting that a test route is not crowded with good visibility and the driver is focusing on the road.

After determining the safety driving test, at block 58, the computing system 10 may optionally notify nearby vehicles of upcoming safety driving test. The computing system 10 may use the communication component 12 to transmit notifications to nearby vehicles (e.g., detected within a threshold distance of the autonomous vehicle, such as 100, 150, or 500 meters). The nearby vehicles may be identified by the autonomous driving system 32 using cameras, radar sensors, or LIDAR sensors and/or proximity communication via near field communications protocols. In some embodiments, the notifications may be broadcasted to receivers (e.g., onboard radios or televisions) of the nearby vehicles, transmitted (e.g., via the network 24) to mobile devices 30 of nearby drivers, transmitted to autonomous driving systems of the nearby vehicles, or combinations thereof. The computing system 10 may notify the nearby vehicles at a predetermined time (e.g., 2, 3, or 5 minutes) prior to the upcoming safety driving test. For the safety driving test including periodic tests, the computing system 10 may notify corresponding nearby vehicles at a same or different predetermined time prior to each of the periodic tests.

At block 60, the computing system 10 may initiate the safety driving test. In some embodiments, the computing system 10 may use the autonomous driving system 32 to initiate the safety driving test at predetermined time and location. In some embodiments, the computing system 10 may use the communication component 12 to send a notification regarding an upcoming initiation of the safety driving test to the mobile devices 30 of the driver. The computing system 10 may use the autonomous driving system 32 to initiate the safety driving test after receiving a confirmation indicating the driver is ready for the safety driving test.

After initiating the safety driver test, at block 62, the computing system 10 may measure driving responses. For example, at a given time, the computing system 10 may cause the autonomous driving system 32 to shut off a full automation mode and enable a partial automation mode, which may allow the autonomous vehicle 26 to perform certain tasks (e.g., steering, accelerating) while the driver may still monitor all tasks and may take control at any time.

The measured driving responses may include various driving actions or tendencies, such as eye movement (e.g., eye focus shifting between mirrors), accelerating, decelerating, texting, entering and leaving traffic, right and left turning, hard braking, making sharp turns, changing lane, turning around, and the like. The measured driving responses may include additional driving responses such as physical or emotional reactions associated with the driving actions.

As mentioned in preceding sections, the computing system 10 may cause the autonomous driving system 32 to use the various sensors 27 or devices to measure the driving responses. For example, after shutting off the full automation mode and enable the partial automation mode, the autonomous driving system 32 may use onboard cameras (e.g., cameras installed on steering wheel or on dash board) to measure driver's responses, such as frequencies of checking side and rear mirrors, eye focusing on approaching vehicles, bikers, pedestrians, or animals, awareness of nearby obstacles or signage, response time and action(s) when the driver takes control of the autonomous vehicle 26, and the like. In addition, the autonomous driving system 32 may use suitable sensors or devices (e.g., LIDAR sensors, inertial sensors, wearable devices) to measure data related to the driving responses, such as speeds, distances or directions of approaching vehicles, distances from nearby bikers, pedestrians, or obstacles, speed and acceleration of the autonomous vehicle 26 when the driver responds to a sharp turn, physical and emotional reactions (e.g., blood pressure, heart rate, saliva and eccrine sweat, trembling limbs or lip), and so on.

At block 64, the computing system 10 may determine a safety driving score based on measured driving responses. The score may vary between 0 (poor driving) and 100 (excellent driving). In some embodiments, the computing system 10 may analyze the measured driving responses and identify certain driving responses, such as response time when an autonomous driving mode is shut off, hard braking, rapid accelerating, eye focusing time on side and rear mirrors when changing lane, speed at a sharp curve, and the like. The computing system 10 may determine the safety driving score by calculating a weighted average of identified impactful driving responses.

In some embodiments, the computing system 10 may determine the safety driving score by comparing the measured driving responses to certain reference data. The computing system 10 may use artificial intelligence, machine learning, and/or data mining to create the reference data. For example, the computing system 10 may use machine learning models to capture patterns in driving responses of other drivers being assessed that are similar to patterns in the measured driving responses of the driver. Such patterns may indicate a similarity of driving conditions and/or similar driving locations.

After determining the safety driving score, at block 66, the computing system 10 may generate a safety test record. The safety test record may include various data associated with the safety driving test, such as the safety driving score, driving condition, autonomous driving mode, driving time, and other relevant data (e.g., driving responses, data related to driving responses). The computing system 10 may create or identify a safety driver record designated to the driver being assessed in the safety driver test. The safety driver record may include the safety test record and identification data of the driver. The computing system 10 may analyze safety driver records of different drivers to perform tasks related to autonomous driving, such as providing a safety driver recommendation, determining a level of autonomous driving, enabling a dynamic autonomous driving, and the like. 12. Additional details related to the safety driver record will be described below with reference to FIGS. 3-5.

Although the example method 50 described in FIG. 2 is described in a particular order, it should be noted that the example method 50 may be performed in any suitable order and is not limited to the order presented herein. It should also be noted that although each processing block is described below in the example method 50 as being performed by the computing system 10, other suitable computing systems may perform the methods described herein.

Figure 3:
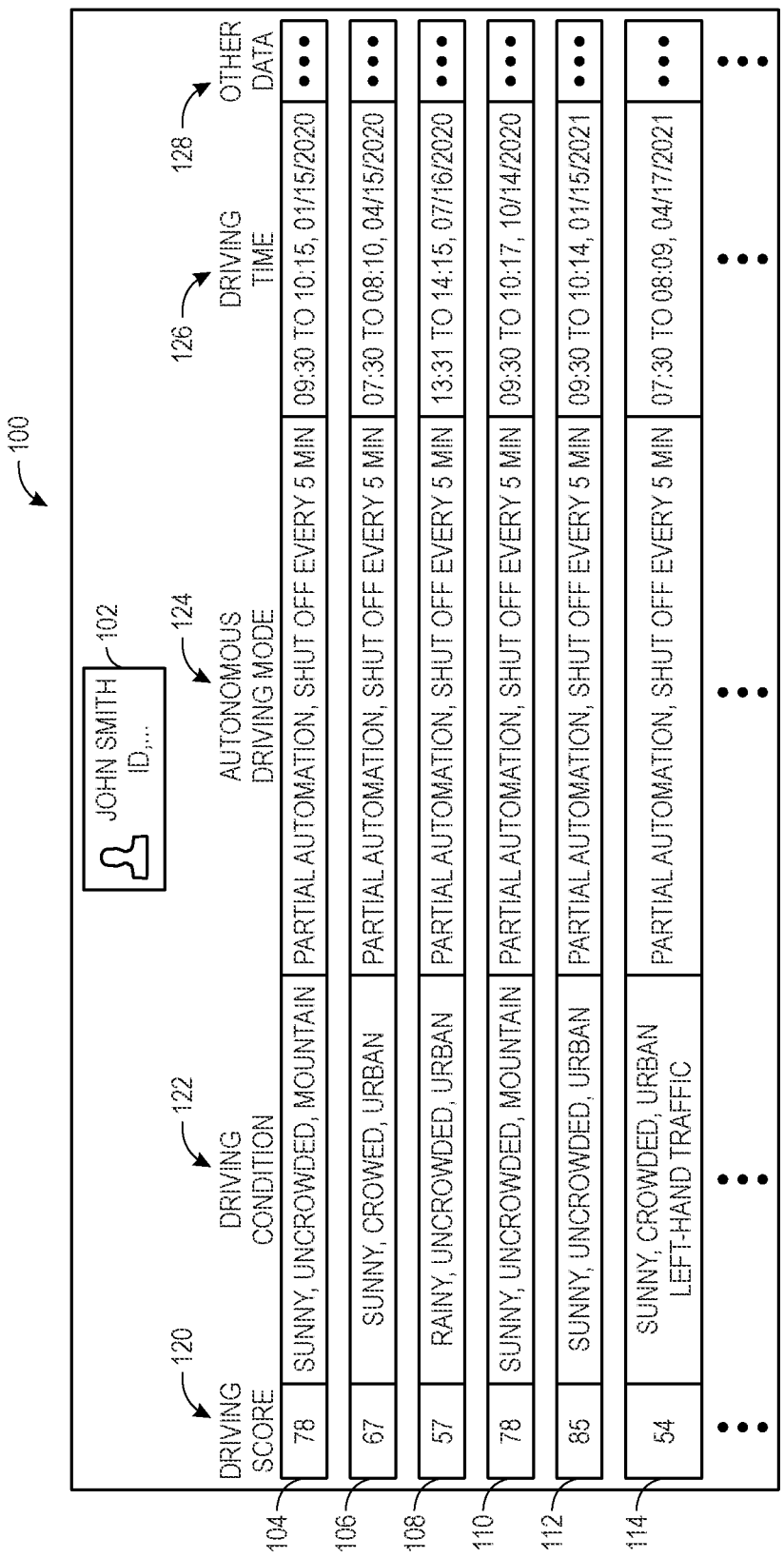
FIG. 3 illustrates an example of a safety driver record containing safety test records generated using the example method of FIG. 2, in accordance with embodiments described herein.

As mentioned previously, the safety driving test may include periodic tests implemented at a predetermined time interval. Using the example of the driver named John Smith described in proceeding sections, the computing system 10 may determine a first test based on the driver input (e.g., urban environment with uncrowded traffic, good visibility, and mountain roads during vacation time) and received driver information. The first test may be implemented on uncrowded urban roads with sunny weather. The computing system 10 may further determine subsequent tests implemented in similar driving conditions as the first test to track changes (e.g., improvement) of driving performance, or implemented in different driving conditions (e.g., crowded urban roads, uncrowded mountain roads) from the first test to recognize new driving skills. With the preceding in mind, FIG. 3 illustrates an example of a safety driver record containing safety test records generated using the example method 50 described above.

As illustrated, the computing system 10 may create (e.g., for a new driver) or identify (e.g., for a driver being assessed previously) a safety driver record 100 designated to the driver John Smith being assessed in the safety driver test. The safety driver record 100 may have a specific format for data configuration. That is, the computing system 10 may collect data from the safety driving test and format the data into the specific format to facilitate subsequent tasks, such as providing a safety driver recommendation or enabling a dynamic autonomous driving. In some embodiments, the computing system 10 may re-organized or re-formatted the collected data into a unified data format or a data structure stored in one or more digital ledgers (e.g., block chains) to enhance data security and protect user privacy.

The safety driver record may include a header 102 and multiple safety test records 104, 106, 108, 110, 112, 114, and so on. The header 102 may include identification data of John, such as name, age, address, driver license number, social security number, photo, and biometric information (e.g., fingerprint, iris patterns, facial features, voice features). Each safety test record may include multiple fields, such as driving score 120, driving condition 122, autonomous driving mode 124, driving time 126, and other data 128.

By consolidating multiple safety test records from periodic safety tests into the safety driver record 100, the computing system 10 may track changes of driving performance and recognize new driving skills with reduced computation time. For example, the computing system 10 may implement a first safety driving test for John based on the driver input. The computing system 10 may search databases and identify (e.g., based on certain identification information) John as a new driver being assessed. The computing system 10 may then create the safety test record 100 including the header 102 and the safety test record 104 corresponding to the first safety driving test. The safety test record 104 may include a first test score 78, driving condition (e.g., uncrowded urban roads with sunny weather), autonomous driving mode (e.g., partial automation mode that is shut off every 5 minutes), driving time (e.g., 09:30 to 10:15, Jan. 15, 2020), and other relevant data (e.g., driving actions, physical or emotional reactions associated with the driving actions).

Furthermore, the computing system 10 may implement subsequent safety driving tests at or closely at a predetermined time interval (e.g., 3 months). For example, computing system 10 may implement a second safety driving test for John in same or similar urban roads with sunny weather. But the test time may be changed to commute time (e.g., 07:30 to 08:10) with crowded traffic condition. The computing system 10 may create the safety test record 106 corresponding to the second safety driving test to include a second test score 67, driving condition, driving time, and other relevant data. A comparison between the first and the second test scores with corresponding driving conditions and driving times may indicate that John has limited capability to operate an autonomous vehicle on crowded urban roads with good visibility. The computing system 10 may implement a third safety driving test on uncrowded urban roads with rainy weather, and a fourth safety driving test on uncrowded mountain roads with sunny weather. Corresponding driving scores and driving-related data may be stored in safety test records 108 and 110, which may indicate that John has difficulty in operating the autonomous vehicle in rainy weather on uncrowded urban roads but has similar performance in sunny weather on uncrowded mountain roads in comparison with results on uncrowded urban roads in the first safety driving test. The computing system 10 may further implement a fifth safety driving test on uncrowded urban roads with sunny weather and create the safety test record 112, which may have similar driving condition as the first safety driving test. A corresponding fifth test score 85 may indicate that John has improved driving performance on urban roads after one year. In addition, the computing system 10 may implement a sixth safety driving test on urban roads with different traffic regulations (e.g., left-hand traffic regulation) in response to user input indicating that John may have autonomous driving trips in areas having left-hand traffic regulation. Test results from the sixth safety driving test may be saved in the safety test record 114.

Figure 4:
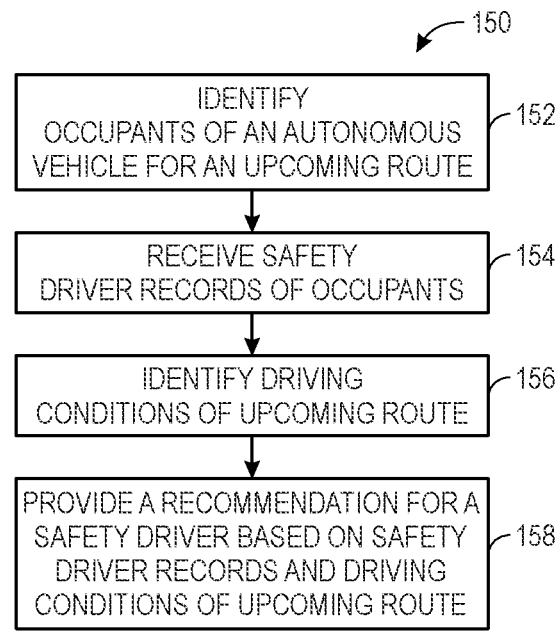
FIG. 4 illustrates a flow chart of an example method for providing a recommendation for a safety driver based on the safety driver records, in accordance with embodiments described herein.

FIG. 4 illustrates a flow chart of an example method 150 for providing a recommendation for a safety driver based on safety driver records of different drivers. For example, multiple users may have a trip using an autonomous vehicle. At block 152, the computing system 10 may identify occupants of the autonomous vehicle for an upcoming route. The computing system 10 may receive occupant information (e.g., names, addresses, biometrics) from the occupants (e.g., using mobile devices 30). Based on received occupant information, the computing system 10 may determine identities of the occupants to reduce identification errors due to various reasons (e.g., same name). The computing system 10 may also receive a brief description regarding the upcoming route (e.g., time, location) from the occupants. In addition, the computing system 10 may receive identification information of an autonomous driving system equipped with the autonomous vehicle, which may enable a communication between the computing system 10 and the autonomous vehicle via the autonomous driving system.

Based on the identities of the occupants, at block 154, the computing system 10 may receive safety driver records of the identified occupants. For example, the computing system 10 may query a safety driver record database to retrieve the safety driver records of the occupants.

At block 156, the computing system 10 may identify driving conditions of the upcoming route. For example, based on time and location information provided in the brief description regarding the upcoming route, the computing system 10 may query a weather database to identify potentially hazardous weather conditions (e.g., rain, snow) at the time of the upcoming route, and query a road condition database to identify potentially impactful road conditions (e.g., curved road, construction) at the location of the upcoming route.

At block 158, the computing system 10 may provide a recommendation for a safety driver based on the safety driver records of the occupants and identified driving conditions of the upcoming route. For example, for each identified driving condition, the computing system 10 may analyze the safety driver records of the occupants to identify each occupant's performance (e.g., response time) in the corresponding driving condition. The computing system 10 may then use artificial intelligence and machine learning to determine an overall performance (e.g., an overall score) for each occupant and identify a safety driver with the best overall performance (e.g., highest overall score). The overall score for each occupant may be calculated based on response times in different driving conditions with corresponding weighting and normalization factors. In some embodiments, the computing system 10 may provide a recommendation with a list of safety drivers arranged based on a rank (e.g., from highest overall score to lowest). In some embodiments, the computing system 10 may provide different recommendations corresponding to different sections of the upcoming route. For example, the upcoming route may be divided into the different sections based on locations having different road conditions (e.g., urban, mountain) or based on times having different weather conditions (e.g., rain, snow). Each recommendation may include a list of safety drivers arranged based on driving performance associated with a particular section of the upcoming route.

In some embodiments, the computing system 10 may use the safety driver record to implement a dynamically selectable autonomous driving mode for a driver. For example, the computing system 10 may determine a level of autonomous driving (e.g., partial automation, conditional automation, high automation, or full automation) based on a safety driver record, a driving history, and alternative driving records (e.g., go-karting, cycling) associated with the driver. The computing system 10 may use the determined level of autonomous driving to enable, via the autonomous driving system 32, a corresponding level of manual driving in the autonomous vehicle 26 operated by the driver. Different levels of autonomous driving may be determined as the periodic tests being implemented, resulting in different levels of manual driving being enabled or unlocked.

Figure 5:
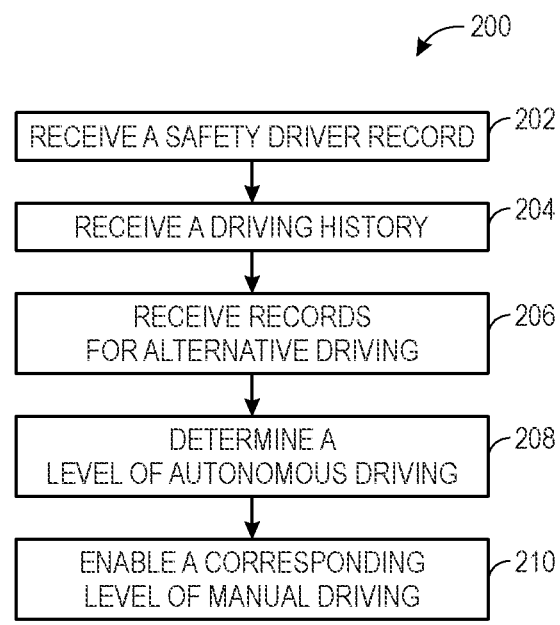
FIG. 5 illustrates a flow chart of an example method for implementing a dynamic autonomous driving based on the safety driver record, in accordance with embodiments described herein.

With the preceding in mind, FIG. 5 illustrates a flow chart of an example method 200 for implementing a dynamic autonomous driving based on a safety driver record of a driver. At block 202, the computing system 10 may receive a safety driver record. The safety driver record may be retrieved by querying a safety driver record database based on identification information of the driver. Using the identification information, at block 204, the computing system 10 may also receive a driving history of the driver by querying a driving history database. The driving history may include driving habits, frequent driving routes, incident reports, and the like. In addition, at block 206, the computing system 10 may receive records for alternative driving of the driver. Such records may include driving activities associated with other driving, such as bicycling, motorcycling, go-karting, and so on. For example, for certain drivers with limited safety driver records or driving history, the computing system 10 may analyze the records of alternative driving to obtain additional information regarding driving behavior or driving habit of the driver.

With the received safety driver record, driving history, and records for alternative driving, at block 208, the computing system 10 may determine a level of autonomous driving. The computing system 10 may use artificial intelligence and machine learning to analyze the received data. For example, the computing system 10 may use artificial intelligence and machine learning to build a simulation model to simulate the driver's responses in different driving conditions. The simulation model may output simulated driving responses matching (e.g., with similarities above certain threshold values) the measured driving responses recorded in the safety driving record, driving history, or records of alternative driving. The simulation model may also output simulated driving responses in certain conditions that are not recorded in the safety driving record, driving history, or records of alternative driving. Based on simulation result, the computing system 10 may determine the level of autonomous driving, such as no automation, partial automation, conditional automation, high automation, or full automation.

At block 210, the computing system 10 may enable a corresponding level of manual driving. For example, for a determined partial automation level, the computing system 10 may enable, via the autonomous driving system 32, a partial manual driving mode in which the driver still monitors all tasks and may take control at any time while the autonomous vehicle 26 performs certain tasks (e.g., steering). In some embodiments, the computing system 10 may enable different levels of manual driving in response to different driving conditions (e.g., weather, crowdedness, or curve). For example, the computing system 10 may identify a driver with high driving scores (e.g., 85) on uncrowded urban roads with sunny weather but with low driving scores (e.g., 57) on similar roads with rainy weather. Accordingly, the computing system 10 may enable a full manual driving for the user when operating the autonomous vehicle 26 on urban roads at time when limited traffic exists, and enable a full autonomous driving for the user when operating the autonomous vehicle 26 on urban roads with rain weather.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:
1. A system, comprising:
    a communication component; and
    a processor configured to couple to the communication component, wherein the processor is configured to:
        trigger a safety driver assessment for a driver operating an autonomous vehicle;
        receive driver information;
        in response to triggering the safety driver assessment and based upon the received driver information, determine a safety driving test, wherein the safety driving test comprises a plurality of periodic tests implemented at a predetermined time interval;
        initiate the safety driving test;
        cause a plurality of sensors of the autonomous vehicle to measure driving responses to the safety driving test;
        determine a safety driving score based on measured driving responses;
        generate a safety test record, wherein the safety test record comprises the safety driving score;
        determine and implement a particular level of autonomous driving from a set of levels, based upon the safety test record by setting the particular level to:
            a full automation driving level when the safety driving score falls below a low safety threshold;
            a conditional automation driving level when the safety driving score is associated with a current driving condition;
            a partial automation driving level when the safety driving score is in a safety range between the low safety threshold and a high safety threshold; and
            a no automation driving level when the safety driving score exceeds the high safety threshold.
2. The system of claim 1, wherein the processor comprises one or more artificial intelligence algorithms, one or more machine learning algorithms, or any combination thereof.
3. The system of claim 1, wherein the processor is configured to notify a plurality of vehicles of the safety driving test, wherein the plurality of vehicles are detected within a threshold distance of the autonomous vehicle.
4. The system of claim 3, wherein the plurality of vehicles are detected using cameras, radar sensors, light detection and ranging sensors, or any combination thereof.
5. The system of claim 1, wherein the processor is configured to initiate the safety driving test via an autonomous driving system.
6. The system of claim 1, wherein the plurality of sensors comprise cameras, radar sensors, light detection and ranging sensors, sonar sensors, global positioning system sensors, and inertial sensors.
7. The system of claim 1, wherein the safety driving score is determined by calculating a weighted average of identified driving responses impactful to driver safety or autonomous vehicle performance.
8. The system of claim 1, wherein the safety driving score is determined by comparing the measured driving responses to a reference data.
9. The system of claim 1, wherein the safety driving test is determined based upon current driving conditions.
10. A method, comprising:
    triggering a safety driver assessment for a driver operating an autonomous vehicle;
    receiving driving related data from a plurality of data sources via a communication component, wherein the driving related data comprises driver information and driving conditions;
    in response to triggering the safety driver assessment, determining a safety driving test based at least in part on the driver information and the driving conditions;

initiating the safety driving test;

receiving driving responses to the safety driving test measured from a plurality of sensors of the autonomous vehicle during the safety driving test;

determining a safety driving score based on the driving responses;

generating a safety test record comprising the safety driving score;

storing the safety test record in a database; and determining and implementing a particular level of autonomous driving from a set of levels, based upon the safety test record by setting the particular level to:

a full automation driving level when the safety driving score falls below a low safety threshold;

a conditional automation driving level when the safety driving score is associated with a current driving condition;

a partial automation driving level when the safety driving score is in a safety range between the low safety threshold and a high safety threshold; and a no automation driving level when the safety driving score exceeds the high safety threshold.

11. The method of claim 10, comprising receiving a request for the safety driver assessment, wherein the request is generated from a user device or an autonomous driving system of the autonomous vehicle.

12. The method of claim 10, wherein the driver information comprises identification information comprising name, age, address, driver license number, social security number, or photo, driving experience, physical condition comprising nearsightedness or disability, driving history comprising driving habits, frequent driving routes, or incident reports, driving behavior, or one or more safety driver records in one or more historical safety driving tests.

13. The method of claim 12, wherein receiving the driving related data from the plurality of data sources comprises receiving the driver information via a user device of the driver, via the database by querying the database based on the identification information, via a network search based on the identification information, or a combination thereof.

14. The method of claim 10, wherein the driving conditions comprise weather, crowdedness, road curvature, terrain, traffic regulation, and signage, or any combination thereof associated with the safety driving test.

15. The method of claim 10, wherein the safety driving test comprises a plurality of periodic tests implemented at a predetermined time interval, a plurality of random tests, or any combination thereof.

16. The method of claim 10, comprising providing one or more autonomous driving services for a driving route, wherein the one or more autonomous driving services comprises:

retrieving a plurality of safety test records associated with a plurality of users comprising the driver from the database;

determining a safety driver from the plurality of users based at least in part on the plurality of safety test records;

generating a safety driver recommendation comprising the safety driver for the driving route; and transmitting the safety driver recommendation to one or more user devices associated with the plurality of users, an autonomous driving system of a vehicle used in the driving route, or a combination thereof.

17. A non-transitory computer-readable medium comprising computer-executable instructions that, when executed, are configured to cause one or more processors to perform operations comprising:

triggering a safety driver assessment for a driver operating an autonomous vehicle;

receiving driver information;

in response to triggering the safety driver assessment and based upon the received driver information, determining a safety driving test;

initiating the safety driving test;

receiving driving responses to the safety driving test from a plurality of sensors of the autonomous vehicle during the safety driving test;

determining a safety driving score based on the driving responses;

generating a safety test record comprising the safety driving score;

storing the safety test record in a database;

determining and implementing a particular level of autonomous driving from a set of levels, based upon the safety test record by setting the particular level to:

a full automation driving level when the safety driving score falls below a low safety threshold;

a conditional automation driving level when the safety driving score is associated with a current driving condition;

a partial automation driving level when the safety driving score is in a safety range between the low safety threshold and a high safety threshold; and a no automation driving level when the safety driving score exceeds the high safety threshold;

retrieving a plurality of safety records associated with the driver and one or more drivers; and determining a safety driver list from a plurality of users comprising the driver for a driving route based at least in part on the plurality of safety records.

18. The non-transitory computer-readable medium of claim 17, wherein the operations comprise enabling a dynamic autonomous driving for the driving route via an autonomous driving system, wherein the dynamic autonomous driving is determined based on the plurality of safety records, driving history, and driving behavior associated with one of more users in the safety driver list, the plurality of users, driving conditions of the driving route, and additional data associated with the one or more users in the safety driver list.

19. The non-transitory computer-readable medium of claim 18, wherein the additional data comprises alternative driving data comprising driving records associated with bicycling, motorcycling, or go-karting.

20. The non-transitory computer-readable medium of claim 17, comprising re-organizing or re-formatting the safety test record into a unified data format or a data structure stored in one or more digital ledgers.

* * * * *